G. L. HOYT.
FEEDING MECHANISM.
APPLICATION FILED APR. 4, 1911.
998,902.
Patented July 25, 1911.
2 SHEETS—SHEET 2.
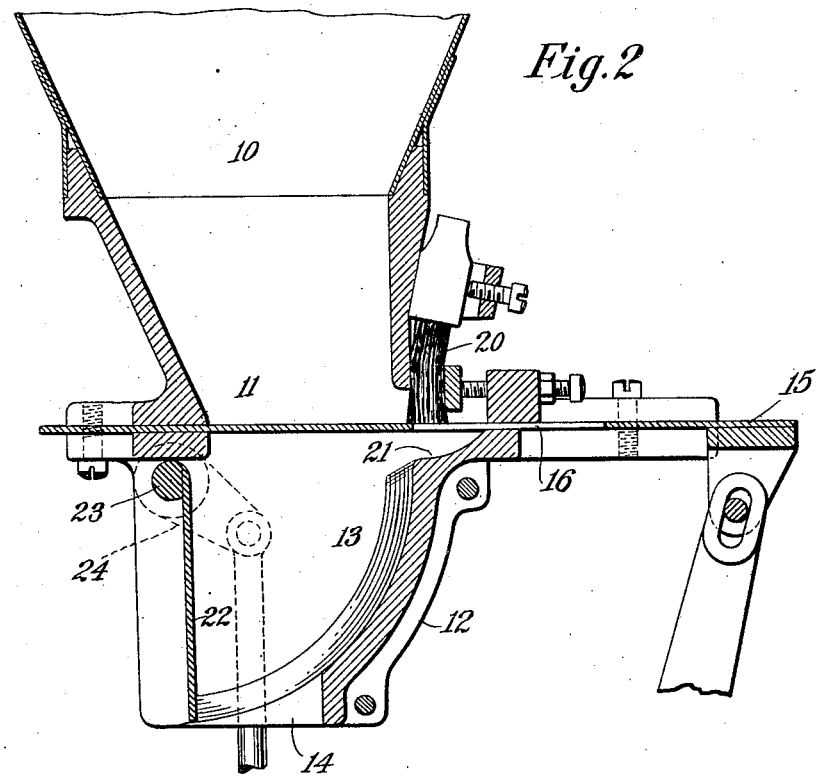
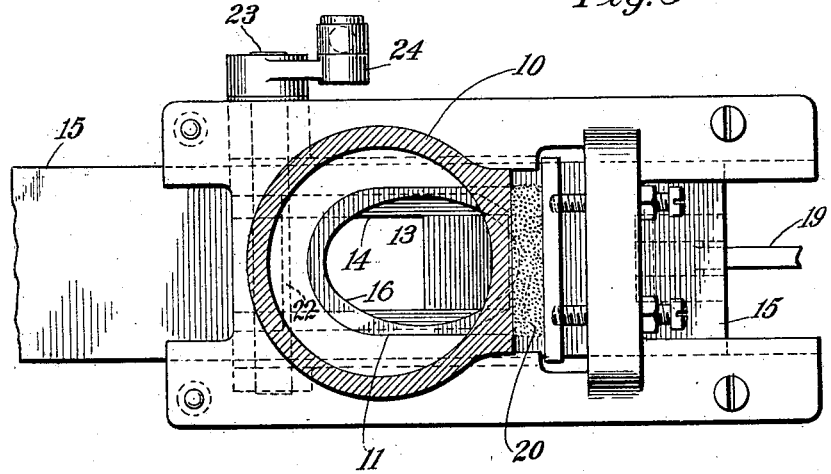

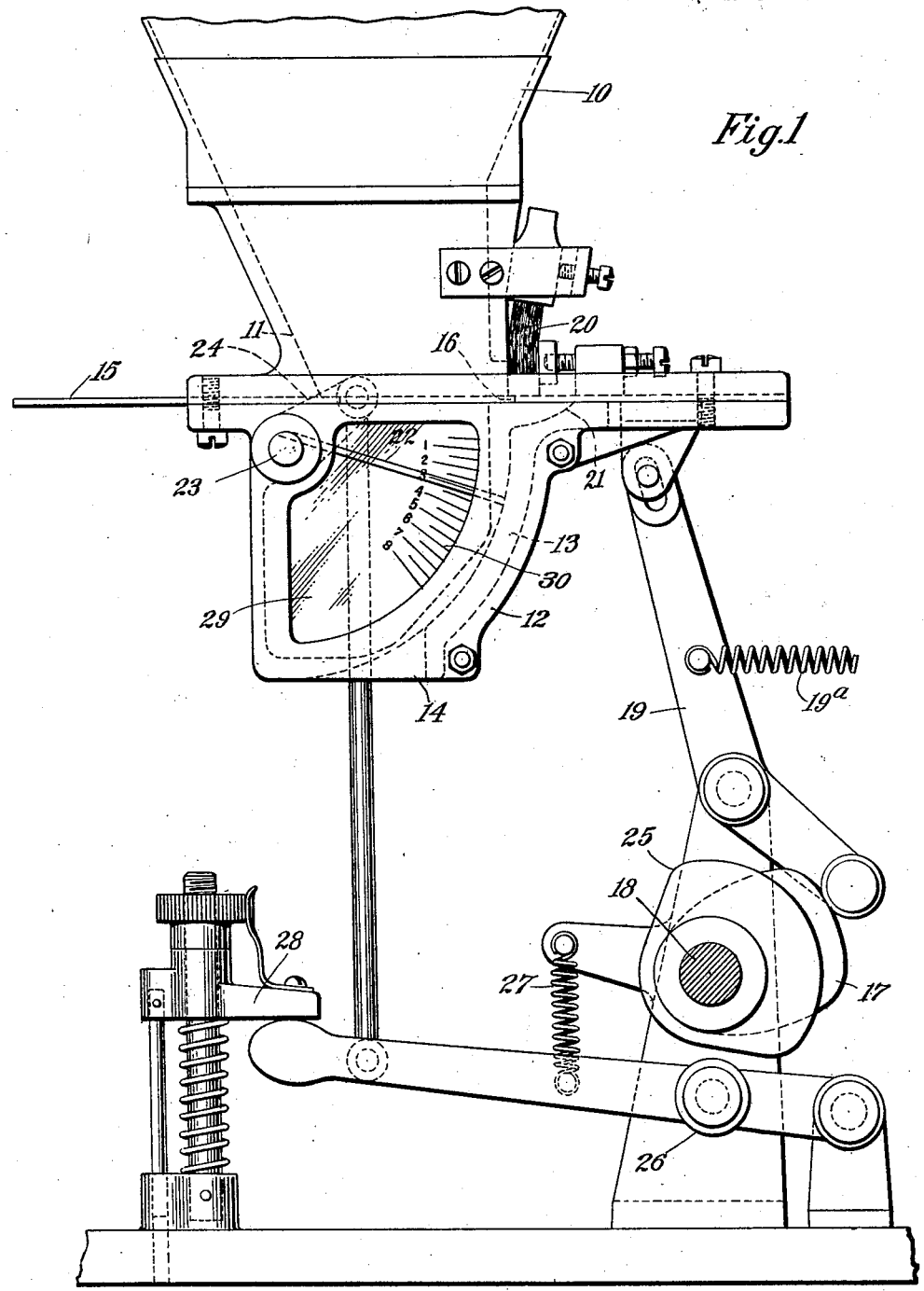

UNITED STATES PATENT OFFICE.

GUY L. HOYT, OF NEW YORK, N. Y., ASSIGNOR TO ROBERT GAIR COMPANY, OF BROOKLYN, NEW YORK, A CORPORATION OF NEW YORK.

FEEDING MECHANISM.

998,902. Specification of Letters Patent. Patented July 25, 1911.

Application filed April 4, 1911. Serial No. 618,804.

*To all whom it may concern:*

Be it known that I, GUY L. HOYT, a citizen of the United States, residing at New York city, borough of Brooklyn, in the county of Kings and State of New York, have invented certain new and useful Improvements in Feeding Mechanisms, of which the following is a specification.

This invention relates to mechanism for feeding loose solid material including seeds, powders, etc., in detached charges of measured volume, and it relates more particularly to those feeders having a measuring-chamber of variable capacity.

My objects are to simplify the constructive principle of such machines, to improve the means provided therein for regulating the quantity of material in each charge, and to render the separate instrumentalities more effective as hereinafter pointed out.

Of the accompanying drawings, Figure 1 represents a side elevation of a feeding mechanism constructed according to my invention. Fig. 2 represents a vertical section of the feeding chamber with its bottom flap opened. Fig. 3 represents a horizontal section taken on a plane above the slide or admission valve.

In the drawings, 10 is a hopper for holding the material in bulk, 11 is the outlet therefrom forming an entrance to the measuring-chamber, 12 is a casing removably attached to the lower end of the hopper and formed with the segmental measuring-chamber 13, and 14 is an outlet from said chamber through which the material is discharged into the pockets, receptacles, chute, or other locality adapted to receive it.

The admission of the material from the hopper to the measuring-chamber is controlled by a horizontally-reciprocating slide 15 containing an aperture 16 which is movable into and out of line with the hopper outlet 11, and as a means for operating this slide I have shown a cam 17 on a shaft 18 acting on the slide through a lever 19 retracted by a spring 19ª.

20 is a brush forming the upper wall of a slot through which the aperture 16 moves, and serving to prevent the crushing of any seeds or other material between said slot wall and the left-hand or cut-off edge of the aperture 16 as the slide is drawn out to shut off the flow of material. On the under side of slide 16 the slot wall is cut away to form a recess or extension 21 of the measuring-chamber, for a similar purpose.

The measuring-chamber 13 is provided with a reciprocating bottom member 22 here shown in the form of a swinging flap mounted on a rock-shaft 23 and adapted to be oscillated thereby into and out of the chamber 13 and across the mouth of its outlet 14. Shaft 23 has an arm 24 and is rocked by a cam 25 on shaft 18 through suitable connections including a follower 26 which is yieldingly projected toward the cam by means of a spring 27. An adjustable stop 28 limits the movement of the follower in the direction of the cam.

29 is a glass window-pane in the side of casing 12 through which the interior of the measuring-chamber may be viewed, and 30 are graduations marked thereon with which the flap 22 may register.

By means of cam 25 and the operating connections for flap 22 the latter is oscillated on its pivot-shaft 23, and in moving on its instroke from the outer or vertical position indicated in Fig. 2 it crosses and closes the outlet 14 and swings up into the measuring-chamber 13. This movement is produced by the spring 27 on the retreat of the cam, and its inner limit depends upon the adjustment of stop 28, which latter accordingly determines the effective depth of the measuring-chamber and the bulk or volume of the charge. The slide or valve 15 remains closed while the outlet 14 is open, but when flap 22 has reached its innermost position the slide 15 is moved to bring its opening 16 in line with the outlet of the hopper 10, and the chamber 13 is allowed to fill by gravity with material from said hopper. Slide 15 immediately returns to its closed position and then the cam 25 causes flap 22 to swing downwardly to its vertical position and discharge the material by gravity through the outlet 14. The minimum volume of charge is measured and delivered when flap 22 on its instroke reaches a substantially horizontal position, and the maximum quantity when said flap reaches only as far as the inner lip of outlet 14. The transparent window 29 enables the operator to observe whether the material is feeding properly and to detect the presence of any foreign substances without stopping or dismembering the machine, and the graduations thereon provide a means for readily gaging the limit of the instroke of flap 22 to correspond with a definite bulk of material.

I claim,—

1. A material feeder comprising a measuring chamber adapted to be fed through the upper end and discharged through the lower, means for intermittently supplying the material to the upper end of said chamber, a bottom member movable into and out of said chamber through the lower end thereof to cover and uncover the discharge mouth of the chamber, means for actuating said member, and means for varying the point of termination of its in-stroke.

2. A material-feeder comprising a hopper, a measuring-chamber having an inlet from said hopper and an outlet, a valve controlling said inlet, a bottom member movable into and out of said chamber and controlling said outlet, means for reciprocating said member, and means for varying the point of termination of the latter's instroke.

3. A material-feeder comprising a measuring-chamber having an outlet, a bottom member mounted for movement into and out of said chamber and adapted to control said outlet, a cam for imparting the outstroke to said member, a spring for imparting the instroke thereto, and an adjustable stop for varying the point at which the instroke ceases.

4. A material-feeder comprising a hopper, a measuring-chamber having an inlet from said hopper and an outlet, a bottom member movable into and out of said chamber and controlling said outlet, means for automatically reciprocating said member, a valve controlling said inlet, automatic actuating means for said valve timed to open and close the latter while said member is substantially at the end of its instroke, and means for varying the point at which said instroke terminates.

5. A material-feeder comprising a segmental measuring-chamber having an outlet, a pivoted valve mounted to oscillate into and out of said chamber and controlling said outlet, and means for varying the point of termination of the instroke of said valve.

6. A material-feeder comprising a hopper, a casing having a segmental measuring chamber with an inlet from said hopper at its upper end and an outlet at its lower end, a valve controlling said inlet, a pivoted bottom flap movable across said outlet and into said chamber, said flap occupying a substantially horizontal innermost and a substantially vertical outermost position, and means for varying the point of termination of the instroke of said flap.

7. A material-feeder comprising a measuring-chamber having an outlet, a transparent window-pane in the side wall of said chamber having graduations associated therewith, and a bottom member adapted to register with said graduations and movable into and out of said chamber to determine the effective depth thereof and to control said outlet.

8. A material-feeder comprising a hopper, a measuring-chamber having an inlet from said hopper and an outlet, means controlling said outlet, a slide controlling said inlet and having a cut-off edge, and a flexible member on the hopper side of said inlet coöperating with said cut-off edge.

9. A material-feeder comprising a hopper, a measuring-chamber having an inlet from said hopper and an outlet, means controlling said outlet, a horizontally-movable slide controlling said inlet and having a cut-off edge, and means forming a slot through which said slide operates, said slot having a flexible upper portion and a recess opposite said flexible portion connecting with the measuring-chamber.

In testimony whereof I have hereunto set my hand in the presence of two subscribing witnesses, this 23rd day of March, 1911.

GUY L. HOYT.

Witnesses:
R. M. PIERSON,
EDWARD E. BLACK.

---

Copies of this patent may be obtained for five cents each, by addressing the "Commissioner of Patents, Washington, D. C."